United States Patent [19]

Mast et al.

[11] Patent Number: 4,745,934
[45] Date of Patent: May 24, 1988

[54] ADHESIVE TAB SYSTEM

[75] Inventors: Rolf Mast, Chino; Jerome D. Muchin, Los Angeles; Joseph A. Neri, Newhall, all of Calif.

[73] Assignees: Lee Pharmaceuticals Inc., South El Monte; Acutek Adhesive Specialties, Ingelwood, both of Calif.

[21] Appl. No.: 915,295

[22] Filed: Oct. 3, 1986

[51] Int. Cl.$^4$ ............ A45D 29/00; A01N 1/00; A01N 3/00; A61F 13/02
[52] U.S. Cl. ............ 132/73; 428/15; 428/41; 428/40; 428/332; 156/61
[58] Field of Search ............ 132/73; 428/15, 40, 428/332, 41, 42, 43, 343; 156/61

[56] References Cited

U.S. PATENT DOCUMENTS

| | | | |
|---|---|---|---|
| 3,008,850 | 11/1961 | Ulrich et al. | 428/355 X |
| 3,565,247 | 2/1971 | Brochman | 428/355 |
| 3,787,531 | 1/1974 | Dahlquist | 428/355 |
| 4,407,310 | 10/1983 | Jadon | 132/73 |
| 4,511,608 | 4/1985 | Ferraro | 428/15 |
| 4,615,348 | 10/1986 | Nakata et al. | 132/73 |

FOREIGN PATENT DOCUMENTS

2019248  10/1979  United Kingdom ............ 428/355

Primary Examiner—George F. Lesmes
Assistant Examiner—D. R. Zirker
Attorney, Agent, or Firm—Joseph E. Mueth

[57] ABSTRACT

A highly tacky continuous, generally self-sustaining film of pressure sensitive adhesive (formed by combining two pre-formed pressure sensitive adhesive films) without any imbedded supporting film uniquely useful for the bonding of two variably curved surfaces in superposed relationship, especially where said two surfaces are a natural fingernail and a superimposed plastic artificial fingernail, the minimum thickness of said film being at least 8 mils, the maximum thickness being about 12 mils, and the minimum initial adhesion to low energy plastic surfaces of said adhesive being at least 9 as defined by 3M Guide at page 16.

In the method of mounting and adhering an artificial nail to a natural finger which includes the steps of:

(1) providing an adhesive tab for covering a substantial portion of the area of the outside surface of the natural nail upon which it is desired to mount an artificial nail;

(2) providing a superposed plastic artificial fingernail;

(3) securing one side of said tab to the outer surface of said natural nail; or the inner surface of said artificial nail;

(4) aligning and pressing said artificial nail, said tab, and said natural nail to adhere the artificial nail to the natural nail in superposed relationship;

the improvement wherein the adhesive tab comprises:

a highly tacky continuous, generally self-sustaining film of pressure sensitive adhesive without any imbedded supporting film uniquely useful for the bonding of two variably curved surfaces in superposed relationship, especially where said two surfaces are a natural fingernail and a superimposed plastic artificial fingernail, the minimum thickness of said film being at least 8 mils, and the minimum initial adhesion to low energy plastic surfaces of said adhesive being at least 9 as defined by 3M Guide at page 16, said self sustaining film being formed by combining two-pre-formed pressure sensitive adhesive films.

12 Claims, No Drawings

ADHESIVE TAB SYSTEM

BACKGROUND OF THE INVENTION

This invention relates to novel adhesive films useful for bonding, particularly useful for bonding artificial fingernails to natural fingernails. Adhesives currently used for such purposes consist of an adhesive film covered on both sides by release papers. Release papers are silicon coated papers that substantially do not stick to the adhesive film.

The current adhesive used in tabular form to adhere plastic artificial fingernails to the natural nail is a 0.005 inch unsupported laminating film (9472 product of 3M). It is in the class of pressure sensitive adhesives generally described as acrylic based. Although this material in general gives good results, there still are a large number of nails which fall off before the intended removal time. The reasons for this are varied and not known for certain.

Due to the difficulties in making coherent adhesive films we are not aware of any commercial adhesive of this type that is substantially thicker than 0.006 inches. This is a critical point as explained below.

An excellent summary of the known prior art in this area can be found in the 3M selection guide for Scotch laminating adhesives, etc. A suitably tacky products for the nail adhesive tab application is listed in this brochure as 9472 (an acrylic based item), in fact this is the product that is used in the most popular prior art adhesive tab. As can be seen from page 17, this material has high adhesion to plastic surfaces. It is a single 5 mil thick film "stabilized" with randomly dispersed glass fibers. These fibers are intended to prevent oozing of the film during die-cutting. Due to manufacturing difficulties it has not been possible to obtain a substantially thicker film in spite of the fact that that severely limits the utility of even that material as a nail adhesive. During the efforts to overcome these problems, we were able to obtain a 10 mil film of "Isotack" laminating film (a #600 series product) from 3M. This material has much less initial tack (and consequently is easier to form in manufacturing). However, this 10 mil thick material did not prove suitable as a nail tab adhesive material becaues of its low initial tack.

Thus, with conventional laminating film technology, it has not proven possible to make an adhesive better than the one currently being used, and better adhesives are among the objectives of this patent.

Double coated adhesives which contain an imbedded carrier film are known. The nature of the carrier film can be varied, but usually takes the form of tissue or a thin plastic sheet. These double coated adhesives can have a single adhesive. Also, they have been constructed with different adhesives on either side of the carrier layer for joining dissimilar surfaces. The construction claimed in U.S. Pat. No. 4,511,608 is an example of a system employing a carrier film tab coated with adhesive in both of its sides.

We have found that it is not possible to solve the problem of premature nail dislocation with the state of the art double coated carrier film adhesives, for three reasons:

a. This first problem is essentially the same as that for unsupported films. Double coated adhesives that contain a flexible carrier film (no more than approximately 0.003 in) and in addition have a suitably tacky adhesive system are not available, to the best of knowledge, in net adhesive thickness greater than 0.008 in. After a certain thickness, which our experience suggests is around 0.003 inches, the carrier film will become so thick and inflexible that the double coated system is completely unsuitable as a nail adhesive. However, having a suitable flexible carrier film again limits the thickness of adhesive that can be applied. Adhesive thickness is even more limited when the adhesive in question is the relatively low viscosity tacky type needed for nail adhesion. Thus there are no commercially available double coated adhesives, which are suitable for nail adhesion, and none which have a net adhesive thickness of greater than 0.008 inches as required in this invention.

b. Any carrier film will partially limit the easy conformability of the adhesive to the natural nail and artificial nail surfaces, even flexible films as defined above which do allow a reasonable measure of nail adhesion. This makes them less effective than otherwise similar unsupported films.

c. Thirdly, with double coated adhesives any adhesive which extends beyond the free edge of the natural nail becomes very difficult to remove. Thus it is difficult to avoid having free adhesive material lodged under the artificial nail causing unsightly soiling problems. Thus, any carrier in an artificial nail bonding system is very detrimental to product use, and so the improved systems of the present invention do not use any double coated adhesives technology.

It has been shown, however, that the uniquely thick (at least 8 mils) and tacky constructs of this invention do give a completely satisfactory adhesion of the plastic to the natural nail.

The foregoing problems of the prior art have been substantially solved by the present invention and it is to be expected that the adhesive film of this invention will be readily accepted in the artificial fingernail art.

SUMMARY OF THE INVENTION

Briefly, the present invention comprises a highly tack continuous, generally self-sustaining film of pressure sensitive adhesive without any imbedded supporting film uniquely useful for the bonding of two variably curved surfaces in superposed relationship, especially those where said two surfaces are a natural fingernail and a superimposed plastic fingernail, the minimum thickness of said film being at least 8 mils, and the minimum initial adhesion to low energy plastic surfaces of said adhesive being at least 9 as defined by 3M Guide at page 16.

This invention also comprehends the method of mounting and adhering an artificial nail to a natural finger which includes the steps of:

(1) providing an adhesive tab for covering a substantial portion of the area of the outside surface of the natural nail upon which it is desired to mount an artificial nail;

(2) providing a superposed plastic artificial fingernail;

(3) securing one side of said tab to the outer surface of said natural nail; or the inner surface of said artificial nail;

(4) aligning and pressing said artificial nail, said tab, and said natural nail to adhere the artificial nail to the natural nail in superposed relationship;

the improvement wherein the adhesive tab comprises:

a highly tacky continuous, generally self-sustaining film of pressure sensitive adhesive without any imbedded supporting film uniquely useful for the bonding of two variably curved surfaces in superposed relationship, especially where said two surfaces are a natural fingernail and a superimposed plastic artificial fingernail, the minimum thickness of said film being at least 8 mils, and the minimum initial adhesion to low energy plastic surfaces of said adhesive being at least 9 as defined by 3M Guide at page 16 said self sustaining film being formed by combining two pre-formed pressure sensitive adhesive films.

It is an object of this invention to provide a novel adhesive film.

More particularly, it is an object of this invention to provide an adhesive film which substantially mitigates the problem of premature dislocation of artificial fingernails.

These and other objects and advantages of this invention will be apparent to those skilled in the art from the more detailed description which follows.

DESCRIPTION OF PREFERRED EMBODIMENTS

It is to be understood that thicknesses referred are approximate, and allowances should be made for normal manufacturing variations.

Items which have been found to be uniquely useful in laminating plastic artificial fingernails to natural nails according to this invention are highly tacky pressure sensitive films that do not contain any carrier film, and which have a minimum adhesive thickness of 8 mil, and a maximum thickness of about 12 mils. These pressure sensitive films are made from two discrete films or layers, each of which is preferably made from acrylic or rubber based formulations. Consequently, the final film, following the construction process, can have a uniform chemical composition or be composed of a maximum of two different formulations. If composed of two different formulations they can be both acrylic, both rubber, or a mixture of the two.

One preferred embodiment of the invention has an about 10 mil final film of acrylic adhesive (9472 from 3M) made from two films of identical composition and each from about 4 to 6 mils in thickness. A preferred embodiment of the invention is composed of a mixed laminate of acrylic (4 to 6 mil thickness) and rubber (4 to 6 mil thickness) based adhesives to yield an overall final thickness of about 10 mils.

Those familiar with pressure sensitive adhesives will recognise that the terms acrylic based, and rubber based products cover a great variety of different products and it is not the intent of this patent to define all of the useful chemical compositions. The initial tack properties are crucial, however, and these will be further defined.

Chemical Composition of Adhesives

Reviews do exist which discuss the chemistry of pressure sensitive adhesives. Examples are "Handbook of Pressure-Sensitive Adhesive Technology", ed. Don Satas, Van Nostrand Reinhold Co., 1982; "Handbook of Adhesives", 2nd. edition, ed. Irving Skeist, Van Nostrand Reinhold Co., pages 724 to 735; and "Pressure-Sensitive Adhesives", Polymer Plast. Technol. Eng., 2(2), 161-229 (1973).

Typical ingredients found in rubber based pressure sensitive adhesives are;

Elastomer: Milled natural rubber, Styrene butadiene rubber, block co-polymers (styrene-butadiene-styrene, styreneisoprene-styrene, etc) butadiene acrylonitrile rubber, and the like.

Tackifier: polyterpene resins, gum resins, rosins, oil soluble phenolic resins, petroleum hydrocarbon resins, and the like.

Additional optional ingredients are:

Plasticizers: Mineral oil, lanolin, dibutyl phthalate, and the like.

Fillers: Zinc oxide, calcium carbonate, clay, and the like.

Rubber antioxidants and structural fibers to prevent product oozing.

1. Rubber Based Adhesives.

Suitable rubber based adhesives are described in U.S. Pat. Nos. 3,239,478 and 3,787,531. The two essential ingredients in a rubber based adhesive are either a synthetic or rubber based elastomer, with an additional tackifying agent. These components are described in detail in the already given references. It is to be understood that for use in this disclosure the chemical compositions (rubber and acrylic) cited would need to be in an appropriate film on a release liner paper. Methods for doing this can take the form of applying a solution coating in the appropriate depth to a liner paper with a blade, and then avaporating off the solvent.

Example 1, from U.S. Pat. No. 3,239,478 gives the following suitably tacky rubber based adhesive products, following evaporation of the toluene solvent. Numbers are in parts by weight.

| Material | Block Copolymer Adhesive | Natural Rubber Adhesive |
| --- | --- | --- |
| Block copolymer[1] | 100 | 0 |
| Natural rubber | 0 | 100 |
| Oil[2] | 75 | 0 |
| Tackifying resin[3] | 125 | 150 |
| Stabilizer[4] | 1 | 1 |

Note 1
The block copolymer had the composition:
Polystyrene—Polyisoprene—Polystyrene
First polystyrene block, molecular weight . . . 43,000
Polyisoprene block, molecular weight . . . 100,000
Final polystyrene block, molecular weight . . . 57,000

Note 2
The extender oil is a petroleum oil that distills in the range of 642° F. to 744° F. It is further described in the patent.

Note 3
The tackifying resin is a glycerol ester of polymerized rosin, which has a softening point by the Hercules drop method of 110° C.

Note 4
This is a phenol/organo tin mixture which is detailed fully in the patent.

Example 7, of U.S. Pat. No. 3,787,531 lists another example of what is a suitably tacky rubber based adhesive.

| Material | Parts by Weight |
| --- | --- |
| Block copolymer[1] | 10 |
| Tackifier[2] | 8 |
| Kraton 107[3] | 2 |

Note 1

Polystyrene (of molecular weight 57,000)+polyisoprene (of molecular weight 123,000)

Note 2

Piccolyte S-115, Pennsylvania Industrial Chem. Corp.

Note 3

Polystyrene—polyisoprene—polystyrene block copolymer from Shell Chemical Co.

The preferred rubber based material is Fasson 406 from the Fasson Industrial Division of Avery International called Fasson 406.

There are other materials which have usefully been incorporated into pressure sensitive adhesives, such as flame retardants, UV adsorbers, heat stabilizers etc., and these may or may not be used within the scope of this invention.

Acrylic based pressure sensitive adhesives use an acrylic polymer as the main elastomer, (Table 13-1 on page 300 of the Satas publication above reveals the unlimited variety of possible acrylic polymers and copolymers) otherwise the other compositional components are as found above in the rubber based adhesives. One major possible difference is that the tackifier in an acrylic adhesive could also be based on an acrylic polymer, and in certain formulations the tackifier and elastomer are one and the same material. An example of this can be found in U.S. Pat. No. 3,924,044, the disclosure of which is incorporated herein by reference.

2. Acrylic Based Adhesives.

Included in the numerous patent in which acrylic based ahdesives are described are U.S. Pat. Nos. 3,008,850, and 3,924,044, and European application No. 0,010,758.

U.S. Pat. No. 3,008,850 cites an acrylic elastomer that has a sufficient degree of tackiness for the current application. This material is a copolymer of approximately 90 parts of isooctyl acrylate and approximately 10 parts of acrylic acid which are randomly copolymerized by well known techniques. As taught in European patent application 0,010,758, additional tackifiers can be added to increase tack further. Useful ranges are in the area of 10 to 30 parts (or more) of the tackifier based on weight of the elastomer. Among the specific tackifiers that can be used are chlorinated biphenyl resins, and coumarone indene resins, polyterpene resins, and rosin derivatives. Many other tackifiers are suitable including Cellolyn 21 (a phthalate ester of hydroabietyl alcohol) from Hercules Inc.

Among suitable formulations for the acrylic pressure sensitive adhesives are:

| Material | Parts by Weight Example | | |
|---|---|---|---|
| | 1 | 2 | 3 |
| Copolymer A[1] M. Wt. 1,500,000 | 100 | 0 | 0 |
| Copolymer A[1] M. Wt. 375,000 | 0 | 100 | 100 |
| Cellolyn 21 | 30 | 15 | 10 |
| Glass fibers[2] | 0 | 4 | 3 |

Note 1

Copolymer A is a random copolymer of 90 parts isooctyl acrylate and 10 parts acrylic acid.

Note 2

The glass fibers are approximately 0.04 inches long and 0.0008 inches thick.

It must be emphasized that these and the rubber based formulations quoted are illustrative only.

The preferred acrylic pressure sensitive adhesive is sold by 3M under the trade designation 3M 9472 laminating adhesive.

It is to be recognized that the preferred polymers will fall within these general formulation trends. Mixtures of useful materials as well as introduction of small quantities of other components in no way has any bearing on the essential features of this invention.

The following Examples serve to illustrate the invention and are not intended to limit it.

EXAMPLE I

A 5 mil film layer was formed by spreading and allowing to set a composition based on 3M 9472 acrylic adhesive. Another 5 mil film was formed from Fasson 406 rubber composition. The two finished films were then laid, one on top of the other to form a continuous, self-sustaining film of 10 mil thickness.

EXAMPLE II

Similar results were obtained using two layers of 3M 9472 acrylic adhesive, each being 5 mil in thickness.

Only adhesives with a very high initial tack are suitable for the adhesion of plastic to human fingernails. In the current state of the art these sufficiently tacky adhesives, as a single layer, come in a maximum thickness of no more than about 6 mil. Good, but still erratic adhesion obtained with these films. Following this invention we were able to prepare thicker, but still highly tacky adhesives and these products did give completely satisfactory adhesion.

Tack of Adhesives

By tack is meant the initial adhesion to low energy plastic surfaces.

Adequate adhesive preformance is described on page 16 of the 3M Selection guide (This is a short description. The document is more fully identified as Scotch Mark Identification Systems, Selection Guide, 20 pages, published by Converter Specialties Division, 3M Corporations, St. Paul, MN 55144-1000, the disclosure of which is expressly incorporated herein by reference.) to Laminating adhesives. Thus on a scale of 1 to 10, as defined by their test methods, adhesion to low surface energy plastics must be in the range of 9 to 10. Thus it can be seen that from the 3M product line the only adhesives of sufficient tack for this invention are the #300 High Strength acrylic, and the #700 Hi-Bond rubber materials. Other products (not in the 3M product line) are acceptable for this invention, provided they fall into this limited range of adhesion to low energy plastic surfaces.

In addition to the 3M data criteria, parallel specific tack values were developed using the Tinius Olsen 6 inch/pound Stiffness Tester. This instrument can be purchased from Tinius Olsen Testing Machine Co. Inc., Willow Grove, Pa. 19090. Even though it was not designed for this purpose the machine works admirable for measurement of a variable angle peel force as would be experienced were an artificial nail to be peeled off a natural nail.

A. Description of Test Pieces

Tests pieces were constructed from two polyethylene segments. Each segment was 1 inch by 1.3 inches×0.18 inches. A test piece was formed by placing an adhesive strip to cover one end of a segment. This adhesive strip measured 1 inch×0.3 inches. The adhesive strip was placed at right angles to the 1.3 inches dimension, with no exposed polyethylene on three of the four sides. A second segment was then placed on the adhesive strip so as to make a test piece. Overlapping of the two segments coincided exactly with the adhesive strip.

Surface preparation in the bonded area was accomplished by washing with acetone, and the careful removal of the top surface layer with a razor blade prior to each experiment.

Because time and pressure is important to the formation of a pressure sensitive adhesive bond, these were controlled before each measurement was taken. Thus, the test piece was constructed immediately before each measurement was taken. This was done by pressing the two segments together lightly, and then setting the bond by placing a two kilogram weight centrally over the joint for one minute.

B. Description of Apparatus

As stated above the apparatus used to measure the adhesion is a Tinius Olsen 6 inch/pound Stiffness tester. The apparatus was equipped with weights for 3 inch pounds of torque (907 grams). The test piece is inserted into the specimen vise until the joint abuts the vise opening. It is oriented so that the free segment is above the segment that is clamped in the jaw. The hand crank is now used to rotate the vise so that the test piece lightly contacts the bending plate. At this point the motor is switched on, and the maximum reading on the load scale which develops before the joint breaks is noted. This number is taken as a direct measure of joint strength, and adhesive effectiveness on the low energy polyethylene plastic surface.

C. Results

Each of the three adhesives tested was done as a 0.010 film, using six measurements. The following results were obtained:

| Adhesive | Maximum Load |
| --- | --- |
| 3M Isotack | 12 ± 4.7 |
| 3M 9472 | 20.5 ± 4.5 |
| Fasson 406 | 31.1 ± 3.7 |

Analysis of variance shows that the Isotack and 9472 adhesives are separated statistically at the 99% confidence level.

D. Conclusion

In-vivo testing showed that with the above three adhesives the isotack is unsuited for adhesion of the nails. It is, however, of sufficiently high viscosity (and low initial tack) as to be the only material of the three that could be formed directly into a 10 mil film. Thus materials which have sufficient tack for good nail adhesion, and therefore necessarily too much tack to be formed into a suitably thick film should have a minimum adhesion in the above Tinius Olsen test of at least 15, and preferably, at least 20. The upper limit is not critical for obvious reasons and can be 40, 50, or more.

DESCRIPTION OF LINER PAPERS

In order to form a practical construct the adhesive film of this invention must be covered on both sides by a liner as well known in the trade. These so-called liner papers can be manufactured out of any suitable paper or plastic film. One feature that they all have in common is the surface is not very attracted to the adhesive. Where the liner is in fact composed of paper, the easy release from the adhesive is achieved by pre-treating the paper with a silicon compound. Where the liner is composed of plastic film, even though the adhesive does have a good adhesion to plastics in general, it can release from the liner through a process known as differential release. Thus the plastic film can pull away from the adhesive film provided the adhesive film is attached on the other side to an even more aggressive surface. One practical construct uses a very easy release silicon-treated paper as the bottom liner and polyethylene film as the top liner. In use the pre-cut tab would be pulled away from the bottom liner with the polyethylene film, adhesive placed on the nail, and then the polyethylene liner pulled away leaving the adhesive exposed for application of the plastic nail. Again in order to achieve a practical use of the product, both liners can be made of silicone paper, where the two papers have a differential release character. Thus the adhesive is pulled away from the easy release bottom liner with the harder release top liner. Then after application to the nail, the top liner can be removed.

It must be understood that the use of different release liners is well-known in the art, and it is this art that we are using to facilitate practical use of the unique adhesive constructs.

EXAMPLE III

The unique functional utility of the new tab constructs was demonstrated by adhesion of plastic nails to human fingernails. People were asked to apply the plastic fingernails, and record which nails became loose over a 24 hour period. The test panelists were unaware which tabs they were using so the observations were without bias.

A numerical score was devised which reflects the panelists observation about when the plastic nails became loose or dropped off.

| Numerical Score | Observations Meaning |
| --- | --- |
| 15 to 10 | Nails fall off almost at once |
| 9.9 to 7.5 | Nails fall off within first few hours |
| 7.4 to 5 | Many nails loose with 24 hours |
| 4.9 to 2.5 | Minimum problems during test |
| <2.5 | Excellent adhesive performance |

Using this panel test the excellent utility of the new constructs can be readily demonstrated.

| Adhesive | Numerical Score |
| --- | --- |
| 3M 9472 (Commercial 5 mil acrylic | 6.0 |
| Fasson 406 (Commercial 5 mil rubber based | >6.0* |
| 10 mil construct 3M 9472 (2 layers, each 5 mil in thickness) | 3.1 |
| 10 mil construct 3M 9472 + Fasson 406, 5 mil of each) | 2.3 |

*The numerical ranking was not done for this but the panelists thought it inferior in adhesion to 3M 9472.

Having fully described the invention, it is intended to be limited only by the lawful scope of the appended claims.

What is claimed is:

1. In the method of mounting and adhering an artificial nail to a natural finger which includes the steps of:
   (1) providing an adhesive tab for covering a substantial portion of the area of the outside surface of the natural nail upon which it is desired to mount an artificial nail;
   (2) providing a superposed plastic artificial fingernail;

(3) securing one side of said tab to the outer surface of said natural nail; or the inner surface of said artificial nail;

(4) aligning and pressing said artificial nail, said tab, and said natural nail to adhere the artificial nail to the natural nail in superposed relationship;

the improvement wherein the adhesive tab comprises:

a highly tacky continuous, generally self-sustaining film of pressure sensitive adhesive without any imbedded supporting film for the bonding of two variably curved surfaces in superposed relationship, especially where said two surfaces are a natural fingernail and a superimposed plastic artificial fingernail, the minimum thickness of said film being at least about 8 mils and not more than about 12 mils, and the minimum adhesion in the Tinius Olsen test of at least 15, said self-sustaining film being formed by combining two-pre-formed pressure sensitive adhesive films.

2. The method of claim 1 wherein the minimum thickness of either of the individual adhesive films is at least about 3 mils.

3. The method of claim 1 where two identical rubber based pressure sensitive adhesive films are used.

4. The method of claim 1 where two different rubber based pressure sensitive adhesive films are used.

5. The method of claim 1 where two identical acrylic based pressure sensitive adhesive films are used.

6. The method of claim 1 where two different acrylic based pressure adhesive films are used.

7. The method of claim 1 where one rubber and one acrylic based pressure sensitive adhesive films are used.

8. The method of claims 1 through 7 which have low release liners on both sides of the film.

9. The method of claim 8 wherein one of the liners is easier to peel from the adhesive film that the other.

10. The method of claims 8 and 9 wherein the easiest to remove liner is contacted with the acrylic adhesive so the acrylic adhesive is exposed first during use of the construct.

11. The method of claims 8 and 9 wherein the harder to remove liner paper, as well as the adhesive film are die-cut through into essentially nail shaped tabs, leaving the easiest to remove liner pape essentially uncut.

12. The method of claim 11 wherein the die-cut matrix, which is the area surrounding the nail shaped tabs, is removed from the rest of the construct.

* * * * *